US009532248B2

(12) United States Patent
Worrall et al.

(10) Patent No.: US 9,532,248 B2
(45) Date of Patent: Dec. 27, 2016

(54) APPARATUSES, METHODS AND COMPUTER PROGRAMS FOR A MOBILE TRANSCEIVER AND A BASE STATION TRANSCEIVER, MOBILE TRANSCEIVER, BASE STATION TRANSCEIVER AND MOBILE COMMUNICATION SYSTEM (75) Inventors: Chandrika Worrall, Newbury (GB); Sudeep Palat, Swindon (GB)

(73) Assignee: Alcatel Lucent, Boulogne-Billancourt (FR)

(*) Notice: Subject to any disclaimer, the term of this patent is extended or adjusted under 35 U.S.C. 154(b) by 121 days.

(21) Appl. No.: 14/356,418

(22) PCT Filed: Aug. 21, 2012

(86) PCT No.: PCT/EP2012/003566
§ 371 (c)(1),
(2), (4) Date: Sep. 17, 2014

(87) PCT Pub. No.: WO2013/068058
PCT Pub. Date: May 16, 2013

(65) Prior Publication Data
US 2015/0017924 A1 Jan. 15, 2015

(30) Foreign Application Priority Data
Nov. 7, 2011 (EP) .................................... 11306443

(51) Int. Cl.
*H04W 24/08* (2009.01)
*H04W 24/10* (2009.01)
(Continued)

(52) U.S. Cl.
CPC .............. *H04W 24/08* (2013.01); *H04W 48/16* (2013.01); *H04W 36/0088* (2013.01); *H04W 36/04* (2013.01); *H04W 84/045* (2013.01)

(58) Field of Classification Search
CPC combination set(s) only.
See application file for complete search history.

(56) References Cited

U.S. PATENT DOCUMENTS 5,513,380 A * 4/1996 Ivanov .................. H04W 36/04
455/441
6,256,500 B1 * 7/2001 Yamashita ............ H04W 36/04
455/437
(Continued)

FOREIGN PATENT DOCUMENTS

JP 2001-503924 A 3/2001
WO WO 2007/088381 A1 8/2007
(Continued)

OTHER PUBLICATIONS

R2-113795, Discussion on enhancement of small cell discovery; 3GPP TSG-RAN WG2 Meeting #75, Aug. 22-26, 2011, Athens, Greece, 3 pp.
(Continued)

*Primary Examiner* — Cindy Trandai
(74) *Attorney, Agent, or Firm* — Fay Sharpe, LLP (57) ABSTRACT Embodiments provide apparatuses, methods and computer programs for a mobile transceiver and a base station transceiver, a mobile transceiver, a base station transceiver and a mobile communication system. The apparatus for the mobile transceiver in a mobile communication system comprises means for receiving information on a periodic measurement configuration for an inter-frequency measurement from a base station transceiver of the mobile communication system on a first frequency layer. The inter-frequency measurement refers to a repetitive measurement on a second frequency layer with a repetition cycle, which is such that the mobile transceiver, when moving at a velocity below a velocity threshold, is located in a coverage area of another
(Continued)

base station transceiver on the second frequency layer for at least two repetition cycles.

18 Claims, 7 Drawing Sheets

(51) Int. Cl.
*H04W 48/16* (2009.01)
*H04W 36/00* (2009.01)
*H04W 36/04* (2009.01)
*H04W 84/04* (2009.01)

(56) References Cited

U.S. PATENT DOCUMENTS

| | | |
|---|---|---|
| 6,285,884 B1 | 9/2001 | Vaara |
| 2004/0152480 A1* | 8/2004 | Willars .............. H04B 7/18541 455/513 |
| 2005/0130662 A1* | 6/2005 | Murai .................... H04J 11/004 455/444 |
| 2009/0197598 A1* | 8/2009 | Fischer ................ H04W 48/10 455/434 |
| 2010/0093358 A1* | 4/2010 | Cheong ............. H04W 36/0055 455/444 |
| 2010/0124934 A1* | 5/2010 | Mach .................... H04W 24/02 455/456.1 |
| 2010/0190488 A1* | 7/2010 | Jung .................... H04W 24/10 455/424 |
| 2010/0234010 A1* | 9/2010 | Fischer ................ H04J 11/0093 455/422.1 |
| 2011/0051687 A1* | 3/2011 | Nakasato .............. H04W 36/30 370/331 |
| 2011/0207414 A1* | 8/2011 | Nakamori ............ H04L 1/0027 455/67.11 |
| 2012/0033595 A1 | 2/2012 | Aoyama et al. |
| 2012/0122515 A1* | 5/2012 | Han ...................... H04W 36/32 455/525 |
| 2012/0129527 A1* | 5/2012 | Takeuchi ............ H04W 52/244 455/436 |
| 2012/0263145 A1* | 10/2012 | Marinier ............... H04W 36/22 370/331 |
| 2012/0315908 A1* | 12/2012 | Li ..................... H04W 36/0083 455/436 |
| 2013/0210443 A1* | 8/2013 | Pedersen ........... H04W 36/0061 455/441 |
| 2014/0031027 A1* | 1/2014 | Dalsgaard ............. H04W 36/30 455/418 |

FOREIGN PATENT DOCUMENTS

| | | |
|---|---|---|
| WO | WO 2007/148911 A1 | 12/2007 |
| WO | 2010/122771 A1 | 10/2010 |

OTHER PUBLICATIONS

R2-114027, HetNet mobility and DRX; 3GPP TSG-RAN WG2 Meeting #75, Aug. 22-26, 2011, Athens, Greece, 4 pp.
English Bibliography for Japanese Patent Application Publication No. JP2001503924A, published on Mar. 21, 2001, printed from Thomson Innovation on Jun. 15, 2015, 4 pp.
English Bibliography for PCT Patent Application Publication No. WO 2010122771A1, published on Oct. 28, 2010, printed from Thomson Innovation on Jun. 15, 2015, 3 pp.
PCT Pat. App. No. PCT/EP2012/003566, Written Opinion of the International Searching Authority, mailed Oct. 25, 2012, 8 pp.
European Patent App. No. 11306443, Extended European Search Report, mailed Mar. 9, 2012, 9 pp.
Alcatel-Lucent, "Inter-frequency RRM and time domain ICIC enhancement," $3^{rd}$ Generation Partnership Project (3GPP), 3GPP TSG-RAN WG2 Meeting #75bis, R2-115349, pp. 1-4, XP050540873, Zhuhai, China, Oct. 10-14, 2011.
International Search Report for PCT/EP2012/003566 dated Oct. 25, 2012.

* cited by examiner

APPARATUSES, METHODS AND COMPUTER PROGRAMS FOR A MOBILE TRANSCEIVER AND A BASE STATION TRANSCEIVER, MOBILE TRANSCEIVER, BASE STATION TRANSCEIVER AND MOBILE COMMUNICATION SYSTEM

Embodiments of the present invention relate to wireless communication, more particularly but not exclusively to inter-frequency measurements between multiple frequency layers of a mobile communication system.

BACKGROUND

In mobile communication networks heterogeneous architectures become more and more important. Heterogeneous Networks (HetNets) are networks which utilize cell types of different sizes, as, for example, macro-cells, pico-cells, and femto-cells. Such cells are established by base station transceivers for which their coverage areas are determined by their transmission power and interference condition. Pico-cells and femto-cells are cells having a smaller coverage area than macro-cells. In some network scenarios the small cells' coverage area can be surrounded by the coverage area of a macro-cell. The small cells can be deployed to extend the capacity of the network. With regard to standardization, within the 3rd Generation Partnership Project (3GPP), Het-Nets have been added to the scope of the Long Term Evolution-Advanced (LTE-A) work item. Since the cells or base stations in such networks may utilize the same frequency resources such architectures can suffer from interference created by the overlapping coverage areas of these cells.

HetNet deployment is used to increase the system capacity and to handle a large amount of traffic especially at hot spots such as town centers. Small cells, e.g. pico-cells, can be deployed in these hot spots. A macro cell can balance the load in the system by offloading mobile transceivers or User Equipment (UEs) to small cells, when the UEs are in the vicinity of a small or pico-cell. The offloaded UEs can then be serviced by the pico-cell with high throughput, especially when the pico-cell is operative at a different frequency layer than the macro-cell.

SUMMARY

Embodiments are based on the finding that a small cell needs to be discovered by the UE for the network to perform an offloading of the UE to the small cell. Furthermore, small cells might be deployed by the operator as required in the network. It is a further finding that a UE may only be in the coverage area of a small cell for a very short period of time given that a small cell only covers a very small geographical area and that a UE can be moving fast. As soon as the UE moves away from the small cell coverage it needs to be handed over to a macro cell to be serviced, which requires additional signaling. Embodiments are based on the finding that offloading of a fast moving UE to a small cell may not be beneficial. Furthermore, handover signaling and interruption to user throughput due to the handovers can be reduced, when handovers of fast moving UEs can be avoided. Moreover, it is a finding that the signaling for cell discovery can be reduced.

Embodiments can provide a concept, which can be used for discovery of small cells without incurring much signaling and, at the same time avoiding fast moving UEs to be offloaded to a small cell. Embodiments are based on the finding that conventional inter-frequency measurement procedures are disadvantageous for small cell discovery in a different frequency layer. For inter-frequency measurements the network may configure measurement gaps and it may request the UE to perform inter-frequency measurements. In other words, when an inter-frequency measurement is triggered, it is based on a network decision and generally involves or depends on the serving cell signal quality. Hence, if there is a need to perform inter-frequency handover, the network can request the UE to perform the inter-frequency measurements.

It is a finding that conventional methods may not be sufficient for small (pico-) cell discovery. Pico-cells are deployed by operators to fill hotspot locations, i.e. to enhance the wireless capacity in high traffic regions, and to which users of the network have access. As opposed to this, there are so called Home enhanced Node Bs (HeNB), which can be installed in users' household and which have access restrictions. HeNB may operate Closed Subscriber Groups (CSGs), i.e. access to such a HeNB is only enabled for a small group of users, the CSG. Hence, a small or pico-cell differs from a HeNB. Furthermore, the number of allowed HeNBs in the system for a given UE is rather low, e.g. about one or two, and also the geographical location, e. g. the users own home, is mostly known by the UE. According to another finding and in contrast to the HeNB scenario, there may be many small cells belonging to, or being located in the coverage area of, the same macro eNB and a UE may be allowed to access all these cells. Thus, storing the locations of all the small cells is difficult for a UE and would involve a large signaling overhead. Moreover, there could be many pico-cells in regions the UE has not visited before, and of which it would not have knowledge of. Therefore, it is a finding that a proximity estimation method based on a UE's autonomous search is not appropriate for small cell discovery as the autonomous search will drain the UE battery unnecessarily.

Embodiments are further based on the finding that an adaptation of existing methods for inter-frequency measurements and HeNB cell proximity estimation to a small cell scenario would lead to large signaling overheads and would not provide a dependency on the UE's speed. Embodiments may therefore provide apparatuses, methods and computer programs for small cell discovery for slow moving (low speed) UEs.

Embodiments provide an apparatus for a mobile transceiver in a mobile communication system, i.e. embodiments may provide said apparatus to be operated by or included in a mobile transceiver. In the following, the apparatus will also be referred to as mobile transceiver apparatus and the terms mobile communication system and mobile communication network are used synonymously.

The mobile communication system may, for example, correspond to one of the mobile communication systems standardized by the 3rd Generation Partnership Project (3GPP), as Universal Terrestrial Radio Access Network (UTRAN) or Evolved UTRAN (E-UTRAN), e.g. Universal Mobile Telecommunication System (UMTS), a Global System for Mobile Communication (GSM) or Enhanced Data Rates for GSM Evolution (EDGE) network, a GSM/EDGE Radio Access Network (GERAN), Long-term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Code Division Multiple Access (CDMA), Orthogonal Frequency Division Multiple Access (OFDMA), Frequency Division Multiple Access (FDMA), Time Division Multiple Access (TDMA), etc.

In embodiments, the mobile transceiver may be implemented in a transceiver of the mobile or wireless end of one of the above networks, i.e. the mobile transceiver may correspond to a smartphone, a cell phone, a user equipment, a laptop, a notebook, a personal computer, a Personal Digital Assistant (PDA), an Universal Serial Bus (USB)-stick, a car, etc. The mobile transceiver apparatus comprises means for receiving information on a periodic measurement configuration for an inter-frequency measurement from a base station transceiver of the mobile communication system on a first frequency layer and the inter-frequency measurement refers to a repetitive measurement on a second frequency layer with a repetition cycle, which is such that the mobile transceiver, when moving at a velocity below a velocity threshold, is located in a coverage area of another base station transceiver on the second frequency layer for at least two repetition cycles. In other words, the mobile transceiver apparatus receives information on a periodic measurement configuration from a base station transceiver. The means for receiving may correspond to a receiver operative to receive signals of the mobile communication system, i.e. it may comprise an antenna, a filter, a low-noise amplifier, etc. In other embodiments the receiver may just be an electrical contact at which a receive signal for further processing is received. The receive signal may already be a digital signal or a protocol unit comprising the information on the periodic inter-frequency measurement configuration. In other words, the means for receiving may correspond to an interface operative to receive the information on the periodic measurement configuration, which in different embodiments may be on different signal processing levels.

The base station transceiver can comply with one of the above cited communication systems. Such a base station transceiver can be located in the fixed or stationary part of the network, it may correspond to a remote radio head, an access point, a macro-cell, a small-cell, a micro-cell, a femto-cell, etc. A base station transceiver can be a wireless interface of a wired network, which enables transmission of radio signals to a user equipment or mobile transceiver. Such a radio signal may comply with radio signals as, for example, standardized by the 3rd Generation Partnership Project (3GPP) or, generally, in line with one or more of the above listed systems. Thus, a base station transceiver may correspond to a NodeB, an eNodeB, an access point, etc. The first and second frequency layers may correspond to two frequency layers or carriers of the mobile communication system. In some embodiments the first and the second frequency layers may correspond to frequency layers or carriers of different systems or operators.

In embodiments, the mobile transceiver apparatus can be associated to the base station transceiver and the means for receiving can be operative to receive the information on the periodic measurement configuration for the inter-frequency measurement through a dedicated connection between the mobile transceiver and the base station transceiver. The mobile transceiver can be associated with the base station transceiver or cell on the first frequency layer. The term cell refers to a coverage area of radio services provided by a base station transceiver or a NodeB, an eNodeB, respectively. A base station transceiver may operate multiple cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A mobile transceiver can be registered or associated with a cell, i.e. it can be associated to a cell such that data can be exchanged between the network and the mobile in the coverage area of the associated cell using a dedicated channel, link or connection.

A cell is thus operated by a base station transceiver and can be seen as a coverage area, which can be identified through reference or broadcast channels with a respective identification, as, for example, a pilot channel. Before a mobile transceiver can transmit payload data to a cell, it has to register, associate or connect with a cell. A mobile transceiver not registered with a cell is in so called idle mode, a registered mobile transceiver is in active or connected mode. One prominent protocol of the 3GPP specifications is the Radio Resource Control (RRC) protocol, cf. Technical Specification (TS) 25.331/36.331 series of 3GPP specifications. RRC specifies multiple procedures for radio resource management of a mobile transceiver, as handover signaling, measurement configuration, cell reselection, reconfiguration, etc. Once a mobile transceiver has established an RRC connection to the respective network entity, e. g. a NodeB, a Radio Network Controller (RNC), an eNodeB, etc., the network entity can trigger the respective procedures, which is why an associated mobile transceiver is also be referred to as in RRC connected mode.

If no RRC context is established the mobile transceiver is also referred to as being in RRC idle mode. In embodiments the apparatus can be in an idle mode, e. g. the mobile transceiver can be RRC idle, and the means for receiving can operative to receive the information on the periodic measurement configuration for the inter-frequency measurement as information broadcast by the base station transceiver. Such information, received via a broadcast channel by the mobile transceiver in idle mode, may correspond to an indicator indicating that the inter-frequency measurements should be carried out or indicating the presence of small or pico-cells on the second frequency layer. In some embodiments such an indicator may correspond to a single bit. In some embodiments the specific configuration of the inter-frequency measurement can be preconfigured at the mobile transceiver, e. g. because the mobile transceiver has received it when it was in connected or associated mode before, or it could also be provided using a broadcast channel.

According to the above, the mobile transceiver is provided with a periodic inter-frequency measurement configuration. It may then carry out periodic measurements on the second frequency layer. The mobile transceiver apparatus comprises means for measuring a radio signal on the second frequency layer based on the information on the periodic measurement configuration to obtain an inter-frequency measurement result. The means for measuring may correspond to a receiver, which is operable to receive the radio signal of the second frequency layer and to obtain a quality measure for the receive signal as the measurement result. For example, the quality measure may correspond to a Signal-to-Noise-Ratio (SNR), a Signal-to-Noise-and-Interference Ratio (SINR), a Bit-Error-Rate (BER), a Frame Error Rate (FER), a Received Signal Code Power (RSCP), a Received Signal Strength Indicator (RSSI), etc. As it has been described above with respect to the means for receiving, the measurement result can be obtained at different signal processing levels as the above quality measures already indicate. The means for measuring may be operable to measure the radio signal on the physical layer, as e.g. in terms of an SNR or SINR, or on a higher layer, as e.g. in terms of BER or FER.

The mobile transceiver apparatus further comprises means for reporting information on the inter-frequency measurement result to the base station transceiver of the mobile communication network, when the inter-frequency measurement result fulfills a threshold criterion. The means for providing can be implemented as a transmitter, e.g. comprising an antenna, an amplifier, a filter, etc. In other embodiments the means for providing can correspond to an electrical contact at which a signal representative for the measurement result is provided, e.g. a digital signal or a protocol unit, etc. The means for providing is operative to provide the information on the inter-frequency measurement result if the quality measure indicates that the signal quality of the radio signal on the second frequency layer exceeds a certain threshold, i.e. fulfills the threshold criterion. Consequently, in different embodiments, different thresholds are conceivable corresponding to the different levels in the processing chain, e.g. a SNR-, SINR-, RSCP-, RSSI-, BER-, FER-, etc. threshold.

Furthermore, embodiments provide an apparatus for a base station transceiver in a mobile communication system, i.e. embodiments may provide said apparatus to be operated by or included in a base station transceiver. In the following, the apparatus will also be referred to as base station transceiver apparatus. The mobile communication system and the base station transceiver may correspond to one of the above described mobile communication systems or base station transceivers.

In line with what was described above for the mobile transceiver apparatus, the base station transceiver apparatus comprises means for providing the information on the periodic measurement configuration for the inter-frequency measurement to the mobile transceiver of the mobile communication system on the first frequency layer and the inter-frequency measurement refers to a repetitive measurement on the second frequency layer with a repetition cycle, which is such that the mobile transceiver, when moving at a velocity below a velocity threshold, is located in a coverage area of another base station transceiver on the second frequency layer for at least two repetition cycles. Moreover, the base station transceiver apparatus comprises means for receiving information on an inter-frequency measurement result from the mobile transceiver. The means for receiving can correspond to a receiver operable for receiving a radio signal from the mobile transceiver in line with the above communication systems. Thus, the means for receiving may comprise an antenna, a filter, a low-noise amplifier, etc. In other embodiments the means for receiving may correspond to an electrical contact at which a receive signal comprising the according information can be input. Again, in line with the above, the receive signal can be at different levels of the processing chain.

Hence, the base station transceiver apparatus receives the measurement report when a cell or signal on the second frequency layer is measured by the mobile transceiver, which fulfills the quality threshold criterion. In line with what was described above for the different states of the mobile transceiver, i.e. idle and connected mode, the base station transceiver apparatus can be associated to the mobile transceiver and the means for providing can be operative to provide the information on the periodic measurement configuration for the inter-frequency measurement through a dedicated connection between the mobile transceiver and the base station transceiver. The mobile transceiver can also be in an idle mode and the means for providing can be operative to provide the information on the periodic measurement configuration for the inter-frequency measurement as broadcast information.

Embodiments provide the advantage that RRC-connected UEs can be configured with inter-frequency measurements to be performed in a slow rate, e. g. with a repetition cycle longer than one second. The long repetition cycle may enable the UE to perform the measurements in the background. In further embodiments the repetition cycle may correspond to more than 100 ms, 200 ms, 300 ms, 500 ms, 640 ms, 1 s, 2 s, 3 s, 5 s, 10 s, 20 s, 30 s, 1 min, 2 min, 3 min, 5 min, etc. In embodiments the repetition cycle can be equal or greater than 640 ms. The repetition cycle can be equal or greater than a Discontinuous Reception (DRX) cycle of the mobile transceiver, e.g. as specified in 3GPP TS 36.331 v10.3.0 (2011 September). In some embodiments a value equal or greater than 640 ms can be used for the repetition cycle. This value corresponds to a longest "short DRX" value defined in the RRC specification (36.331 v10.3.0 (2011 September)). An RRC connected UE can be configured with "short DRX" or "long DRX". If the measurement repetition cycle is larger than or equal to longest configurable value for "short DRX" it can be considered as relaxed measurement. In embodiments the repetition cycle can be such that a relaxed performance requirement is achieved as compared to the 3rd Generation Partnership Project, Technical Specification 36.101 v10.4.0 (2011 September).

In embodiments the information on the periodic measurement configuration can comprise information on repetitive time windows. A time window can correspond to a time span during which an inter-frequency measurement should be carried out. The time span can correspond to one of the above listed durations of the repetition cycle. In embodiments, the repetitive time windows can be defined by means of one or more elements of the group of a starting point, an end point, duration, a number of repetitions, etc. These parameters can be provided in a relative manner, e. g. relative to a radio frame number, a hyper frame number, a time slot, a Time Transmission Interval (TTI), etc. The means for measuring can then be operative to measure the radio signal on the second frequency layer at least once per time window. In further embodiments the information on the periodic measurement configuration can further comprise information on a number of measurements to be taken within the time window and the means for measuring can then be operative to perform the number of measurements within the time window.

Embodiments can provide the advantage that performance requirements for inter-frequency measurements can be relaxed as compared to inter-frequency measurements for handover purposes. For example, the measurement configuration may use periodical measurements with a longer periodicity. Therewith, a UE may not perform inter-frequency measurements with the same periodicity as, for example, required for normal radio resource management regarding handover purposes.

The base station transceiver apparatus may further comprise means for adapting the duration of a time window. The means for adapting can be implemented as an adaptor, a controller, a processor, any means for determining an advantageous window size as will be detailed in the sequel. The window size can be adapted such that the mobile transceiver, when moving slower than a velocity threshold carries out at least two inter-frequency measurements, while moving along a straight line through a center of a small cell on the second frequency layer. In other words, embodiments may provide the advantage that the network can adapt the repetitions of the inter-frequency measurements of the mobile transceiver based on its velocity and a respective cell size, i.e. the inter-frequency measurement can be adapted such that a fast moving UE would not be able to measure a radio signal exceeding the threshold criterion of a small cell in the second frequency layer twice, for a given geometrical size of the small cell in the second frequency layer. A slow moving UE would however be able to be in the coverage area of the small cell in the second frequency layer long enough to measure the radio signal from the small cell fulfilling the threshold criterion multiple times. That is to say, the mobile transceiver may carry out a single measurement when moving along a straight line through the center of the small cell on the second frequency layer, when moving faster than the velocity threshold. Thus, embodiments can provide the advantage that inter-frequency measurement reporting can be adapted to the geometrical properties of the network on the second frequency layer and to the mobility properties of the mobile transceivers. In embodiments, the velocity thresholds can, for example, correspond to 1 mph, 3 mph, 5 mph, 10 mph, 20 mph, 30 mph, 50 mph, 1 kmh, 3 kmh, 5 kmh, 10 kmh, 20 kmh, 30 kmh, 50 kmh, etc.

Moreover, in further embodiments the base station transceiver apparatus can comprise means for detecting proximity of the mobile transceiver to a cell of the second frequency layer based on the information on the inter-frequency measurement result. In other words, based on the inter-frequency measurement result the base station transceiver apparatus may detect proximity of the mobile transceiver to a small cell in the second frequency layer. The means for detecting can be implemented as a detector, or a processor, or any device which is capable, for example, to identify a cell the measurement report refers to as a small cell. Moreover, the means for providing can be operative to provide information on another inter-frequency measurement to the mobile transceiver in response to the reception of the information on an inter-frequency measurement result. In other words, once the Measurement result is received the mobile transceiver may be reconfigured with another inter-frequency measurement, which enables the network to make a better or more advantageous handover decision. For example, the other inter-frequency measurement may instruct the UE to take more frequent measurements or to measure further quality measures.

Being configured with the information on the periodic measurement configuration to obtain an inter-frequency measurement result, the UE can perform measurement reporting in case of fulfilling a configured measurement threshold value as threshold criterion. The UE may then report to the network a Physical Cell Identity (PCI) for the inter-frequency cell which fulfills the threshold value. That is to say, in embodiments the information on the inter-frequency measurement result may comprise a physical cell identity of a base station transceiver or cell being operative on the second frequency layer. A base station transceiver may establish one or more cells in the second frequency layer. The PCI may enable the base station transceiver apparatus to determine whether the reported cell is a cell to which a handover of the mobile transceiver would be beneficial, e. g. when the mobile transceiver is slow moving and the reported cell is a small cell in the second frequency layer. The means for providing of the base station transceiver apparatus can then be operative to provide information on a handover instruction to the mobile transceiver subsequent to the reception of the information on the inter-frequency measurement result. In embodiments the mobile transceiver apparatus can be adapted to report on multiple base station transceivers or cells using a single inter-frequency report message comprising multiple PCIs. That is to say, based on the reported inter-frequency PCIs, the network can identify whether the UE is in the proximity of a small cell.

In another embodiment, the UE can be configured with a small cell PCI list and the UE only performs measurement reporting if it finds a small cell from the list. In other words, the information on the measurement configuration can comprise a list of physical cell identities, which indicate base station transceivers or cells operative on the second frequency layer. The means for measuring can be operative to measure radio signals of the base station transceivers, which are indicated in the list of physical cell identities. The base station transceivers or cells operative on the second frequency layer of the list may correspond to small cells or pico cells. The list may comprise one or more base station transceivers or cells having a coverage area on the second frequency layer, which is smaller than the coverage area of the base station transceiver (macro-cell) on the first frequency layer, which the mobile transceiver can be associated to.

The one or more base station transceivers or cells having a coverage area on the second frequency layer may have less than half of the size of the coverage area of the base station transceiver (macro-cell) on the first frequency layer, which the mobile transceiver can be associated to. The one or more base station transceivers or cells on the second frequency layer comprised in the list may correspond to small cells or pico cells, while the base station transceiver on the first frequency layer may correspond to a macro cell. For some embodiments, the different cell sizes can be distinguished by the diameter of their coverage area. For example, a macro-cell can correspond to a cell having a diameter lager than 1 km, 2 km, or 3 km. A small cell can correspond to a cell having a diameter being less than that of a macro cell, i.e. less than 1 km, 2 km, or 3 km. A pico-cell can correspond to a cell having a diameter being less than that of a small cell, e.g. less than 500 m, 200 m, or 100 m.

Due to the long periodicity and the relaxed performance requirements, which can be enabled by embodiments the number of measurements by the UE for small cell discovering purposes is reduced as compared to the number measurements for handover purposes. Therewith, embodiments may enable a reduced UE battery consumption compared to conventional inter-frequency measurements performed by the UE. The longer reporting period is acceptable because slow moving UEs will still find a small cell and in some embodiments, only slow moving UEs are moved or handed-over into the small cell. Moreover, long periodicity may also avoid possible handover to a small cell triggered by a fast moving UE, which may result in ping pong effects.

Moreover, for UEs which are configured according to embodiments in RRC-connected mode and transfer subsequently to RRC-idle mode, the relaxed inter-frequency measurement configuration can be applied in RRC-idle as well. Such UEs may then perform autonomous inter-frequency search for inter-frequency small cell discovery. Such a UE autonomous search could be triggered by information broadcast in a cell—a bit indication or the small cell PCI range.

Embodiments can further provide a mobile transceiver, comprising the above described mobile transceiver apparatus, a base station transceiver, comprising the above described base station transceiver apparatus, and/or a mobile communication system, comprising the mobile transceiver and/or the base station transceiver.

Embodiments further provide a method for a mobile transceiver in a mobile communication system. The method comprises a step of receiving information on a periodic measurement configuration for an inter-frequency measurement from a base station transceiver of the mobile communication system on a first frequency layer. The inter-frequency measurement refers to a repetitive measurement on a second frequency layer with a repetition cycle, which is such that the mobile transceiver, when moving at a velocity below a velocity threshold, is located in a coverage area of another base station transceiver on the second frequency layer for at least two repetition cycles. The method comprises a further step of measuring a radio signal on the second frequency layer based on the information on the periodic measurement configuration to obtain an inter-frequency measurement result and a step of reporting information on the inter-frequency measurement result to the base station transceiver of the mobile communication network when the inter-frequency measurement result fulfills a threshold criterion.

Embodiments further provide a method for a base station transceiver in a mobile communication system. The method comprises a step of providing information on a periodic measurement configuration for an inter-frequency measurement to a mobile transceiver of the mobile communication system on a first frequency layer. The inter-frequency measurement refers to a repetitive measurement on a second frequency layer. The method comprises a further step of receiving information on an inter-frequency measurement result from the mobile transceiver.

Embodiments can further comprise a computer program having a program code for performing one of the above described methods when the computer program is executed on a computer or processor.

Embodiments may avoid unnecessary offloading of fast moving UEs to a small cell and may also provide the UEs with better battery consumptions by reducing the number of required measurements as compared to RRM handover measurements and making the signaling involved more efficient. Embodiments may provide an effective way of small cell discovery; hence embodiments may assist the load balancing of the mobile communication system and efficient system resource utilization.

BRIEF DESCRIPTION OF THE FIGURES

Some other features or aspects will be described using the following non-limiting embodiments of apparatuses and/or methods and/or computer programs by way of example only, and with reference to the accompanying figures, in which.

DESCRIPTION OF SOME EMBODIMENTS

In the following some components will be shown in multiple figures, where similar reference signs refer to similar components. Repetitive descriptions may be avoided for simplicity purposes. Features or components depicted in dotted lines are optional.

Figure 1:
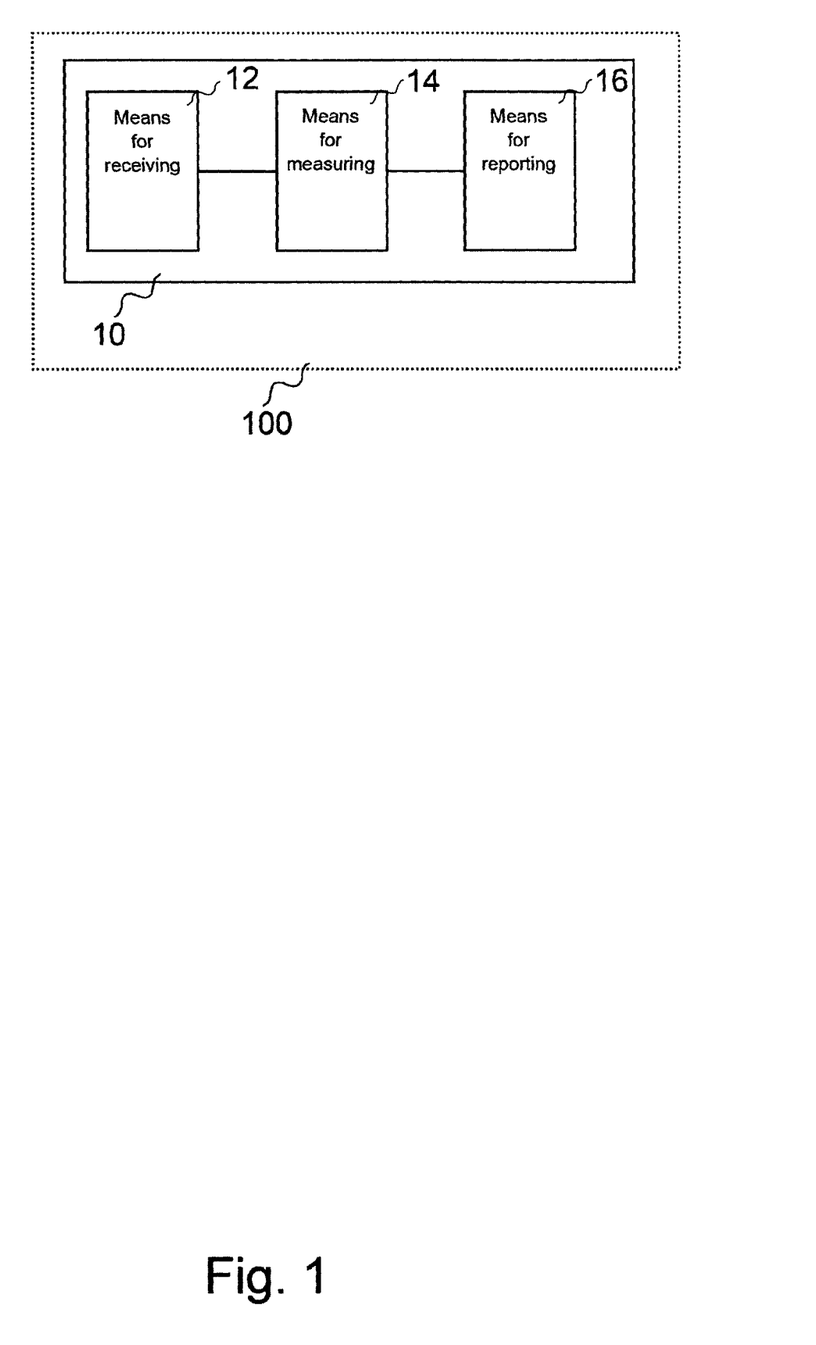
FIG. 1 shows an embodiment of a mobile transceiver apparatus.

FIG. 1 shows an embodiment of an apparatus 10 for a mobile transceiver 100 in a mobile communication system. The communication system for the embodiment of FIG. 1 is an LTE or LTE-A communication system. The apparatus 10 comprises means for receiving 12 information on a periodic measurement configuration for an inter-frequency measurement from a base station transceiver 200 of the mobile communication system on a first frequency layer. The base station transceiver apparatus 20 and the base station transceiver 200 will be detailed using FIG. 2. The inter-frequency measurement refers to a repetitive measurement on a second frequency layer with a repetition cycle, which is such that the mobile transceiver 100, when moving at a velocity below a velocity threshold, is located in a coverage area of another base station transceiver 315 on the second frequency layer for at least two repetition cycles, e.g. longer than one second or 640 ms. The mobile transceiver apparatus 10 further comprises means for measuring 14 a radio signal on the second frequency layer based on the information on the periodic measurement configuration to obtain an inter-frequency measurement result. The means for measuring 14 is coupled to the means for receiving 12. Furthermore, the mobile transceiver apparatus 10 comprises means for reporting 16 information on the inter-frequency measurement result to the base station transceiver 200 of the mobile communication network, when the inter-frequency measurement result fulfills a threshold criterion. The means for reporting 16 is coupled to the means for measuring 14.

Figure 2:
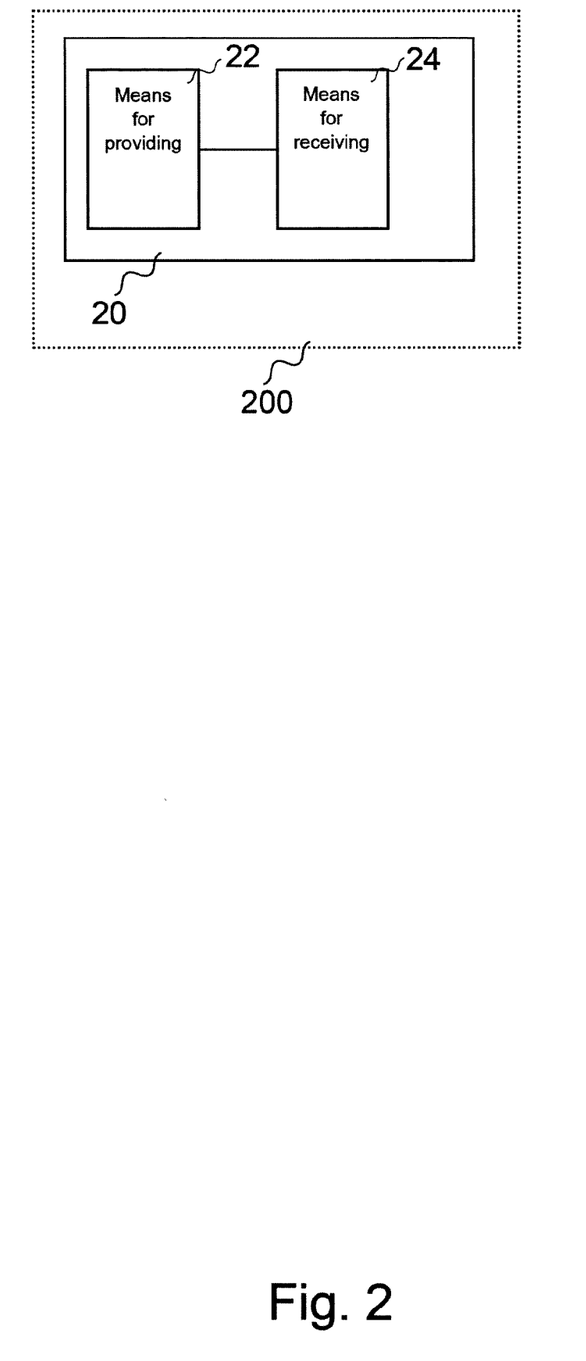
FIG. 2 shows an embodiment of a base station transceiver apparatus.

FIG. 2 illustrates an embodiment of an apparatus 20 for a base station transceiver 200 in the mobile communication system. The base station transceiver apparatus 20 comprises means for providing 22 the information on the periodic measurement configuration for the inter-frequency measurement to the mobile transceiver 100 of the mobile communication system on the first frequency layer. The inter-frequency measurement refers to a repetitive measurement on a second frequency layer with a repetition cycle, which is such that the mobile transceiver 100, when moving at a velocity below a velocity threshold, is located in a coverage area of another base station transceiver 315 on the second frequency layer for at least two repetition cycles. The base station transceiver apparatus 20 further comprises means for receiving 24 the information on the inter-frequency measurement result from the mobile transceiver 100. The means for receiving 24 is coupled to the means for providing 22.

Two different situations are distinguished, namely when the mobile transceiver (100) can be in idle or connected mode. When the mobile transceiver is in connected mode, i.e. the apparatus 10 is associated to the base station transceiver 200, the means for receiving 12 is operative to receive the information on the periodic measurement configuration for the inter-frequency measurement through a dedicated connection between the apparatus 10 and the base station transceiver 200. Hence, the base station transceiver apparatus 20 is associated to the mobile transceiver 100 and the means for providing 22 is operative to provide the information on the periodic measurement configuration for the inter-frequency measurement through the dedicated connection between the mobile transceiver 100 and the base station transceiver. When the mobile transceiver is in idle mode, i.e. the apparatus 10 is in an idle mode, the means for receiving 12 is operative to receive the information on the periodic measurement configuration for the inter-frequency measurement as information broadcast by the base station transceiver 200. Thus, the means for providing 22 at the base station transceiver apparatus 20 is operative to provide the information on the periodic measurement configuration for the inter-frequency measurement as broadcast information.

Figure 3:
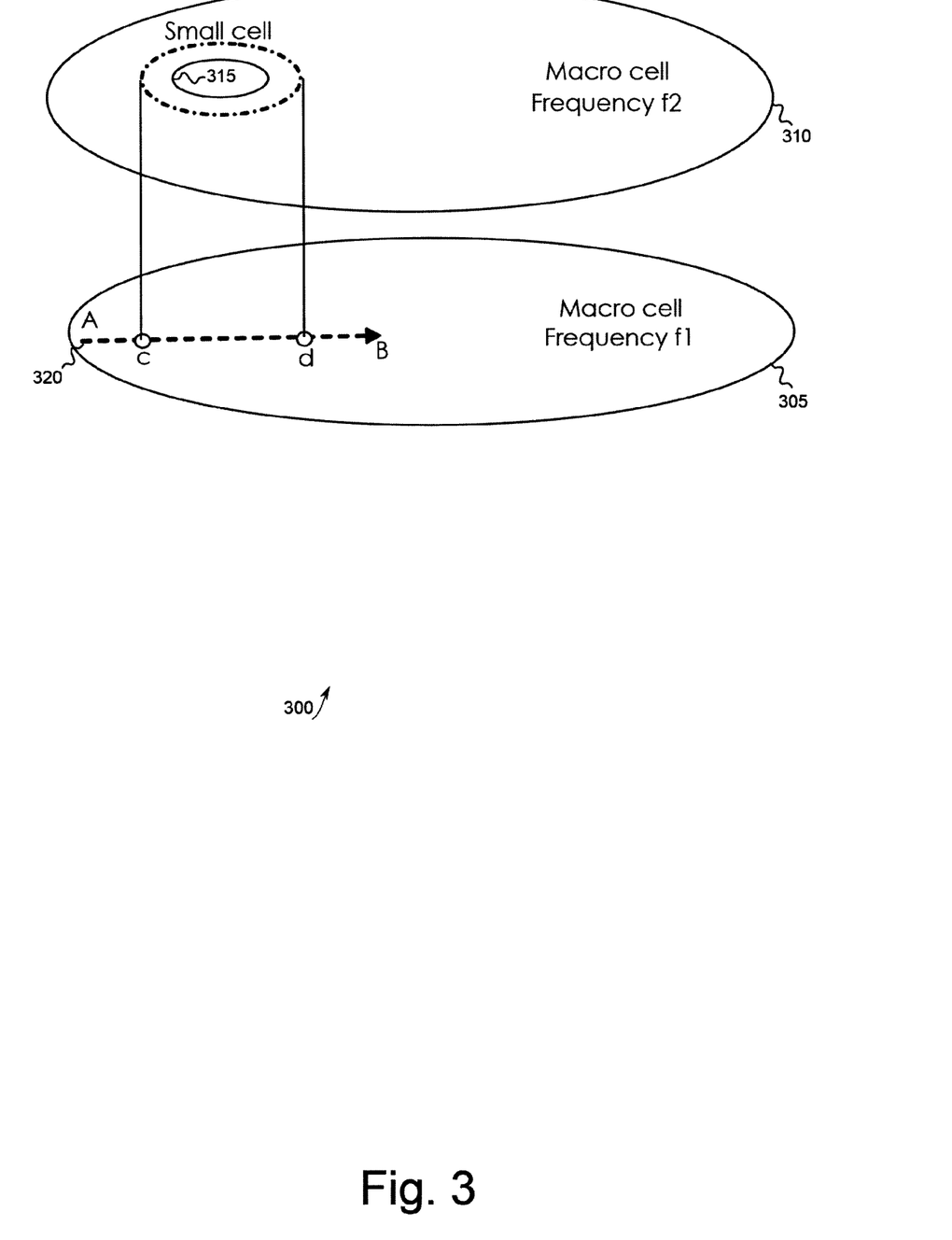
FIG. 3 illustrates a network scenario with embodiments.

FIG. 3 illustrates a communication system 300 with a macro cell 305 operative at a first frequency layer f1 and another macro cell 310 operative at a second frequency layer f2. FIG. 3 depicts cells in terms of their coverage areas, for the ease of depiction the corresponding base station transceivers are not shown. On the second frequency layer f2 there is a small cell 315, which is embedded in the macro cell 310. Moreover, FIG. 3 illustrates a path 320 of a mobile transceiver 100 moving from a point A to a point B, passing points c and d.

In FIG. 3 it is assumed that an RRC connected UE 100, i.e. a mobile transceiver 100 associated with the macro-cell 305, is moving from point A to point B. The UE 100 is connected to the macro-cell 305 on the first frequency layer f1. According to the above, the UE 100 is configured with a periodic inter-frequency measurement on the second frequency layer f2. Hence, the UE 100 is carrying out inter-frequency measurements on the small cell 315 and macro-cell 310 on the second frequency layer f2. At the point c the UE 100 measurement of the small cell 315 satisfies the threshold criterion and thus the UE 100 reports to the macro cell 305 it is associated to on the first frequency layer f1. The UE 100 reports the inter-frequency measurements on the first frequency layer f1 at point c together with the PCI of the small cell 315. In other words, the information on the inter-frequency measurement result comprises the physical cell identity of the base station transceiver or small cell 315 being operative on the second frequency layer f2.

The network or the base station transceiver of macro-cell 305 identifies the small cell 315 and possibly re-configures the measurement for inter-frequency as, for example, specified in Release-10 of the 3GPP specifications, cf. 3GPP TS 36.331 V10.2.0 (2011 June), Evolved Universal Terrestrial Radio Access (E-UTRA); Radio Resource Control (RRC). That is to say, the base station transceiver apparatus 20 of macro-cell 305 comprises means for detecting proximity of the mobile transceiver 100 to the small cell 315 of the second frequency layer 12 based on the information on the inter-frequency measurement result. The means for providing 22 is operative to provide information on another inter-frequency measurement, e.g. the above referenced Release 10 inter-frequency measurement, to the mobile transceiver 100 in response to the reception of the information on an inter-frequency measurement result. Based on the accurate measurements the macro-cell 305 may then decide to offload the UE to small cell 315 on the second frequency layer 1. Hence, the means for providing 22 at the base station transceiver apparatus 20 is operative to provide information on a handover instruction to the mobile transceiver 100 subsequent to the reception of the information on the inter-frequency measurement result.

Figure 4A:
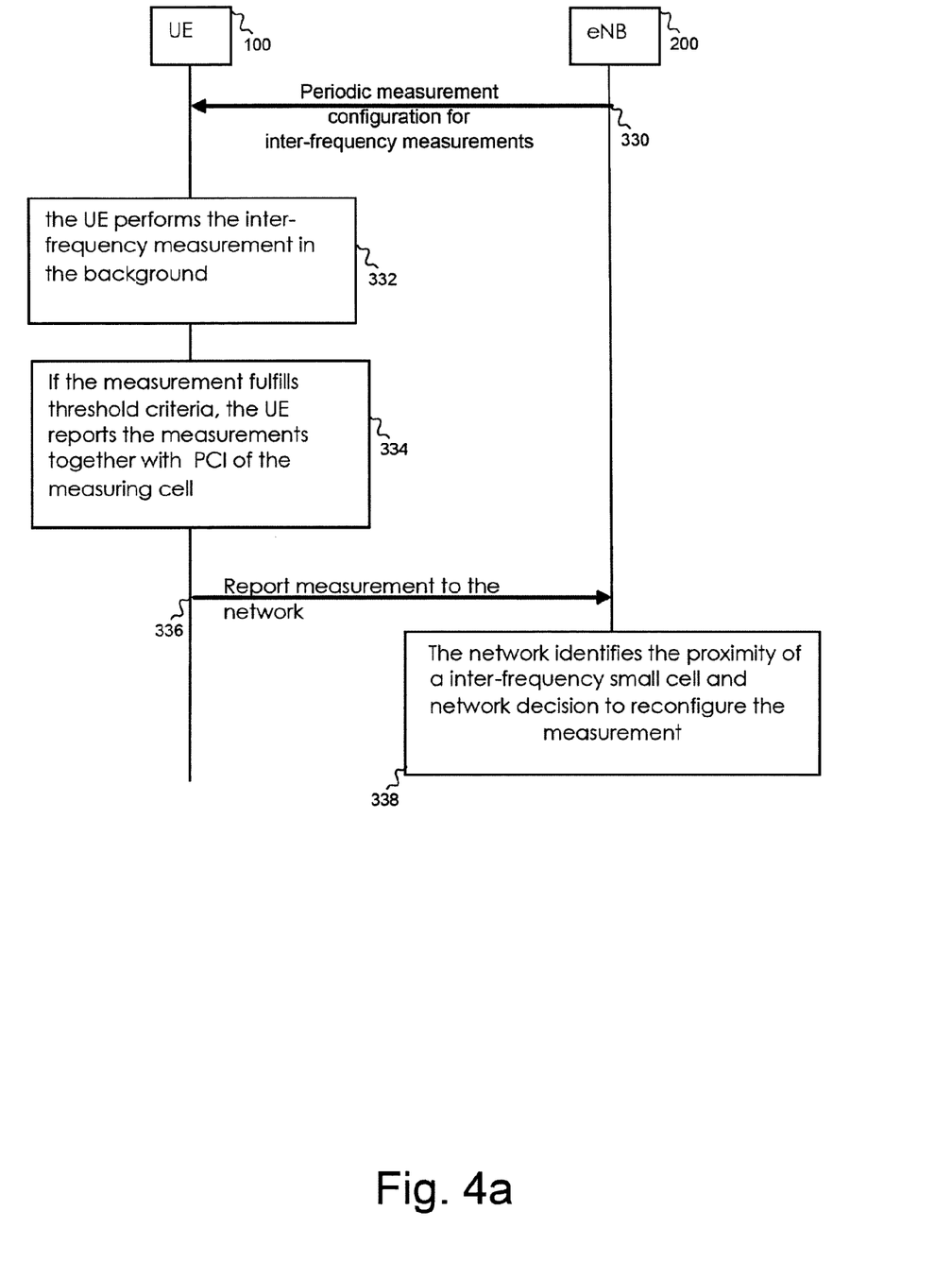
FIG. 4a illustrates a message sequence chart for an embodiment.

FIG. 4a illustrates a message sequence chart for an embodiment. In the message sequence chart the UE or mobile transceiver 100 is depicted on the left and the base station transceiver 200 or macro-cell 305 is depicted on the right. In line with FIG. 4a, in a first step 330 the periodic measurement configuration for the inter frequency measurements, i.e. the information on the periodic measurement configuration for an inter-frequency measurement, is provided by the eNB 200 and received by UE 100. The network configures the periodic measurement configuration for inter-frequency measurements. The information on the periodic measurement configuration for an inter-frequency measurement may comprise one or more elements of the group of a measurement periodicity, a threshold for the measurement report criterion, measurement gaps, a measurement object for the corresponding inter-frequency, etc. The UE 100 performs the measurements in the background as indicated by step 332 in FIG. 4a.

In a subsequent step 334 the UE 100 reports the measurement result when the measurement criterion is met together with the PCI of the corresponding cell, e.g. small cell 315 of FIG. 3. Upon the reception of the measurement, the network may identify proximity of a small cell in step 338, and the network may decide to reconfigure the inter-frequency measurement such that more accurate measurements can be performed by the UE 100 for handover purposes. Thus, the base station transceiver apparatus 20 may further comprise means for detecting proximity of the mobile transceiver 100 to a cell 315 of the second frequency layer based on the information on the inter-frequency measurement. The means for providing 22 is then operative to provide information on another inter-frequency measurement to the mobile transceiver 100 in response to the reception of the information on the inter-frequency measurement result. Advantages of embodiments become clear when the described message sequence chart of FIG. 4a is compared to the conventional procedure, for which the details can be found in section 10.5.1.2 of 3GPP TS 36.300, Evolved Universal Terrestrial Radio Access (E-UTRA) and Evolved Universal Terrestrial Radio Access Network (E-UTRAN); Overall description; Stage 2; V10.4.0, (2011 June).

Figure 4B:
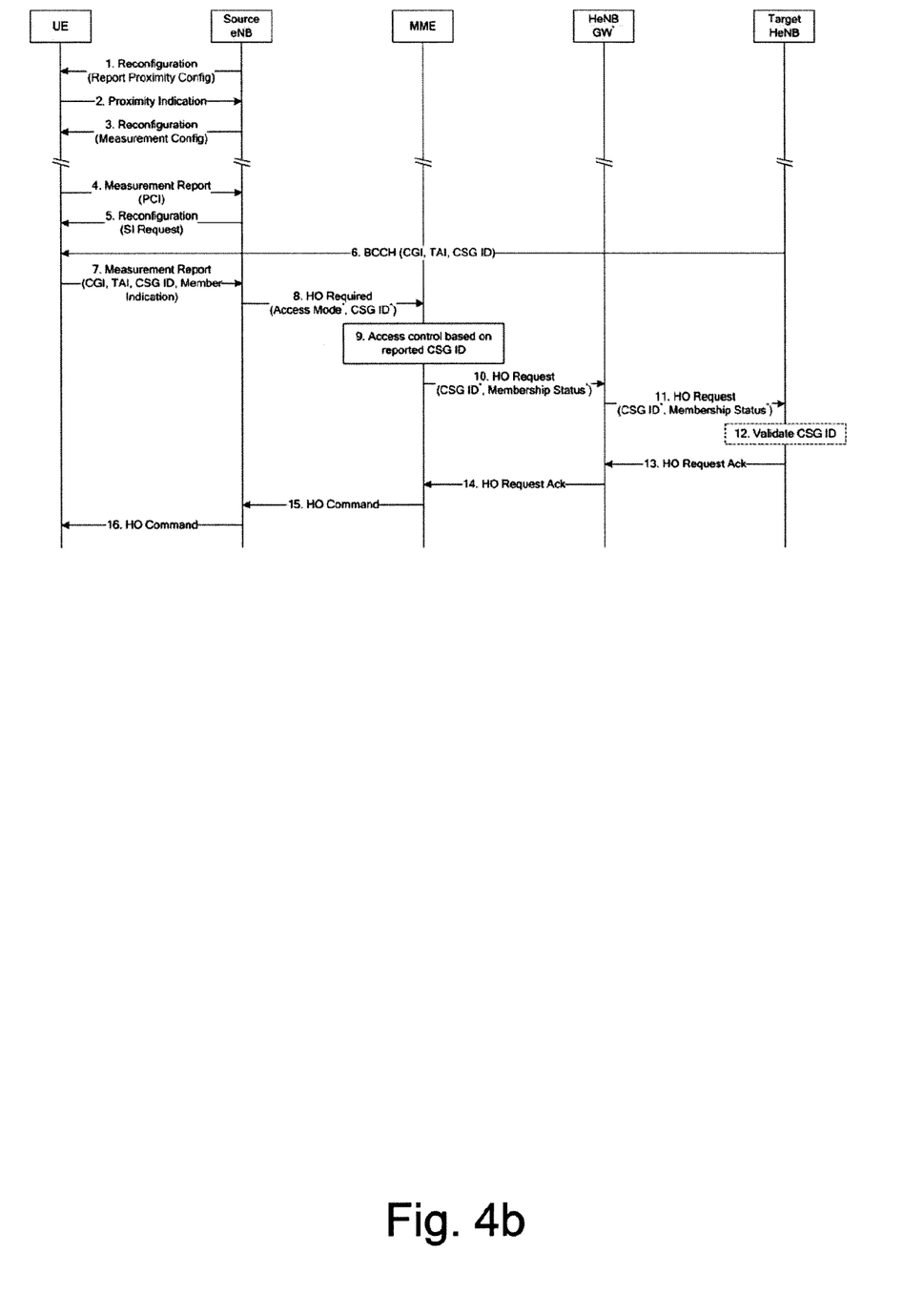
FIG. 4b illustrates a message sequence chart for a handover to a HeNB.

FIG. 4b illustrates a message sequence chart for a handover to a HeNB according to the conventional procedure. Handover to a Home enhanced NodeB (HeNB) follows a procedure based on proximity estimation. The UE may be able to determine, using autonomous search procedures, that it is near a Closed Subscriber Group (CSG) or HeNB cell which's CSG IDentification (ID) is in the UE's whitelist, i.e. a list of CSG cells, which allow access of the UE. The UE may then provide an indication of said proximity to the source eNB. For allowed CSG cells (allowed HeNB) a proximity indication can be used to report the UE proximity to an allowed CSG cell. This is possible because there are normally only a few CSG cells in a UE's whitelist and a UE can store the "location" of these CSG cells once it has visited them. The "location" of the CSG recorded by the UE can, for example, be a Radio Frequency (RF) fingerprint or geographical coordinates. When at the vicinity of an allowed HeNB, the UE can inform the network of its proximity to a HeNB. The proximity indication can then be used to configure measurements for the corresponding inter-frequency, e.g. a corresponding measurement gap. Furthermore, such proximity estimation is performed by the UE based on an autonomous search. If a proximity indication is configured by the network, the UE informs the network of proximity to a HeNB when found. When comparing the message sequence charts of FIGS. 4a and 4b it can easily be seen that the signaling overhead can be reduced by embodiments. Embodiments may provide the PCI together with the measurement report or only provide measurement reports for a predetermined list of cells subsequently to the configuration message, according to the above description. Thus, the number of messages and therewith the signaling overhead can be reduced by embodiments.

In another embodiment, the UE 100 is also informed of a list of cells for measurements, in order to assist the UE's 100 search procedure for the small cells 315 in the second frequency layer. Thus, the information on the measurement configuration comprises a list of physical cell identities, which indicate base station transceivers 315 operative on the second frequency layer. The means for measuring 14 is then operative to measure radio signals of the base station transceivers 315, which are indicated in the list of physical cell identities. The base station transceivers or cells 315 operative on the second frequency layer of the list may comprise one or more base station transceivers or cells 315 having a coverage area on the second frequency layer, which is smaller than the coverage area of the base station transceivers 305 on the first frequency layer, i.e. the list may comprise one or more small cells 315. As shown in FIG. 3 the base station transceiver or cell 305 corresponds to a macro-cell on the first frequency layer. The size of the coverage area of the small cell 315 on the second frequency layer is less than half the size of the coverage 20 area of the macro-cell 305 on the first frequency layer. For example, the macro-cell 305 can correspond to a cell having a diameter lager than 21 cm. The small cell 315 on the second frequency layer can correspond to a cell having a diameter being less than 21 cm, it may correspond to a pico-cell 315 having a diameter being less than 200 m.

In another embodiment, the UEs 100 performance requirement is relaxed such that the UE 100 only performs few measurements in a long period to meet the performance requirement, which is why the repetition cycle is, for example, longer than one second or 640 ms. The repetition cycle may be based on time windows. That is to say, the information on the periodic measurement configuration comprises information on repetitive time windows. The means for measuring 14 is then operative to measure the radio signal on the second frequency layer at least once per time window. Moreover, the information on the periodic measurement configuration comprises information on a number of measurements to be taken within a time window. The means for measuring 14 is then operative to perform the number of measurements within the time window. The time window and the number of measurements to be taken in the time window can be used to define the measurement requirements, which are more relaxed than the inter-frequency measurement requirements for the Release 10 inter-frequency measurements for handover purposes.

For idle mode UEs, the relaxed performance requirement may result in less wake-ups for measurements, hence, it may result in lower power consumption. For RRC connected UEs, the relaxed performance requirements can be defined taking into account UE's Discontinuous Reception (DRX) requirement of measurements gaps. In embodiments the base station transceiver apparatus can comprise means for adapting a duration of a time window for the inter-frequency measurement such, that the mobile transceiver 100, when moving slower than a velocity threshold, carries out at least two inter-frequency measurements when moving along a straight line (straight from A to B in FIG. 3) through a center of a small cell 315 on the second frequency layer. In other words, the mobile transceiver 100 may carry out a single measurement when moving faster than the velocity threshold along a straight line through the center of the small cell 315 on the second frequency layer.

Figure 5:
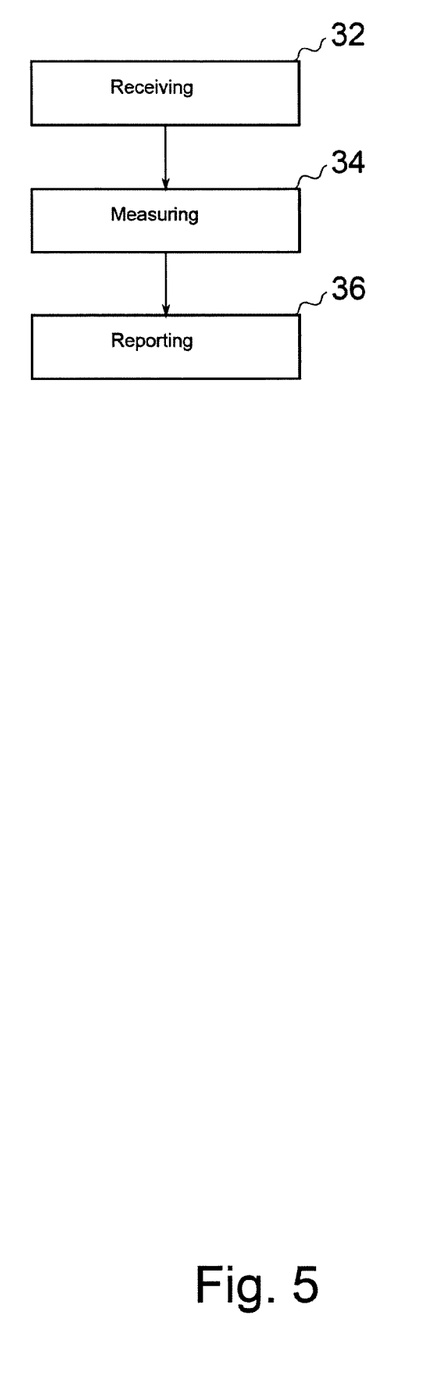
FIG. 5 shows a flow chart of an embodiment of a method for a mobile transceiver.

FIG. 5 shows a flow chart of an embodiment of a method for a mobile transceiver 100 in a mobile communication system 300. The method comprises a step of receiving 32 information on a periodic measurement configuration for an inter-frequency measurement from a base station transceiver 200 of the mobile communication system 300 on a first frequency layer. The inter-frequency measurement refers to a repetitive measurement on a second frequency layer with a repetition cycle, which is such that the mobile transceiver 100, when moving at a velocity below a velocity threshold, is located in a coverage area of another base station transceiver 315 on the second frequency layer for at least two repetition cycles. The method comprises a further step of measuring 34 a radio signal on the second frequency layer based on the information on the periodic measurement configuration to obtain an inter-frequency measurement result. Furthermore, the method comprises a step of reporting 36 information on the inter-frequency measurement result to the base station transceiver 200 of the mobile communication network 300, when the inter-frequency measurement result fulfills a threshold criterion.

Figure 6:
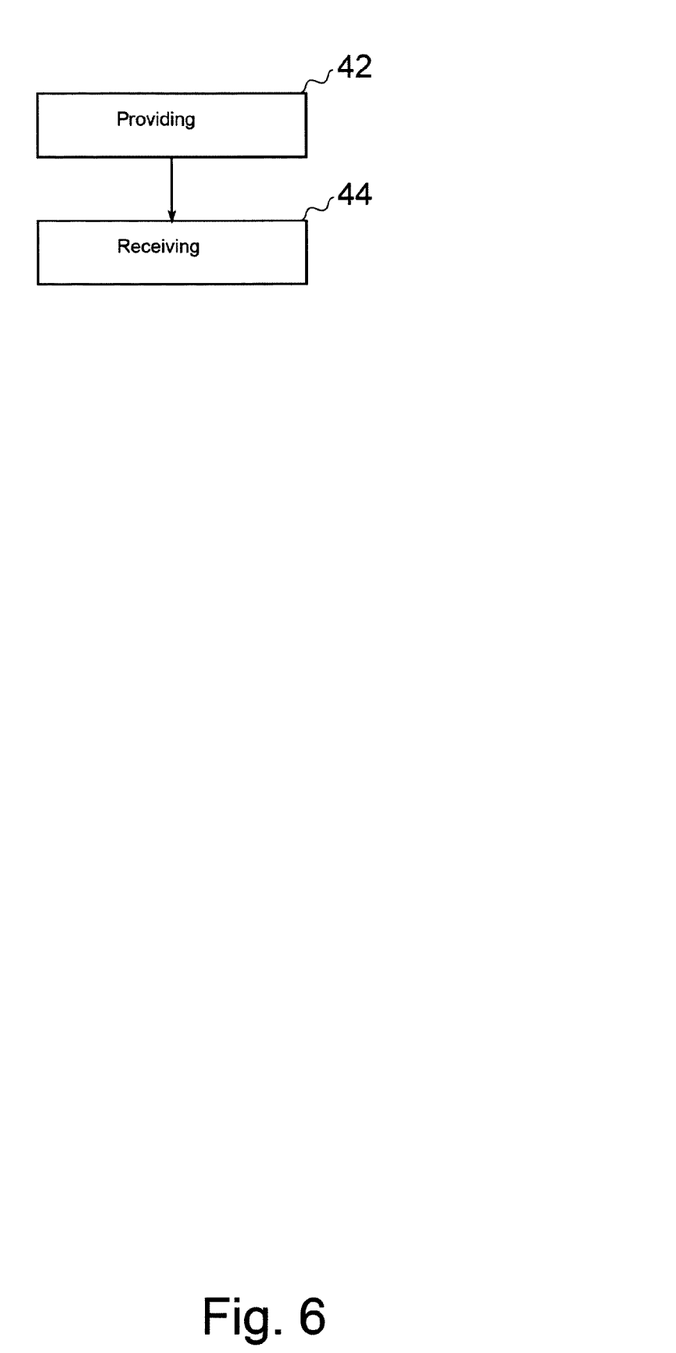
FIG. 6 shows a flow chart of an embodiment of a method for a base station transceiver.

FIG. 6 shows a flow chart of an embodiment of a method for a base station transceiver 200 in a mobile communication system 300. The method comprises a step of providing 42 information on a periodic measurement configuration for an inter-frequency measurement to a mobile transceiver 100 of the mobile communication system 300 on a first frequency layer. The inter-frequency measurement refers to a repetitive measurement on a second frequency layer with a repetition cycle, which is such that the mobile transceiver 100, when moving at a velocity below a velocity threshold, is located in a coverage area of another base station transceiver 315 on the second frequency layer for at least two repetition cycles. The method further comprises a step of receiving 44 information on an inter-frequency measurement result from the mobile transceiver 100.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for receiving", "means for measuring", "means for reporting", "means for providing", "means for adapting", "means for detecting", etc., may be provided through the use of dedicated hardware, such as "a receiver", "a measurer", "a reporter", "a provider", "an adaptor", "a detector", "a processor", "a controller", "a DSP", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A user equipment for wireless communication in a mobile communication system, comprising:
   a receiver configured to receive information from a macrocell base station of a mobile communication system on a first frequency layer, wherein the information includes a periodic measurement configuration identifying a repetition cycle for inter-frequency measurements for a second frequency layer used by a smaller cell base station when a coverage area formed by the smaller cell base station is within a coverage area formed by the macrocell base station, wherein the repetition cycle is such that, when the user equipment moves at a velocity below a velocity threshold through a central portion of the coverage area of the smaller cell base station, the user equipment makes inter-frequency measurements for at least two repetition cycles while the user equipment was within the coverage area of the smaller cell base station;
   at least one processor configured to perform the inter-frequency measurements in accordance with the repetition cycle associated with the periodic measurement configuration, the inter-frequency measurements including a signal measurement of a radio signal from the smaller cell base station on the second frequency layer while the user equipment moved through the coverage area of the smaller cell base station, wherein the signal measurement is indicative of a signal quality of the corresponding radio signal; and
   a transmitter configured to report information on the inter-frequency measurements to the macrocell base station on the first frequency layer, wherein the information on the inter-frequency measurements is reported when the signal quality represented by the signal measurement is greater than a reporting threshold such that the transmitter avoids reporting information on inter-frequency measurements when the signal quality represented by the signal measurement is not greater than the reporting threshold;
   wherein the information carrying the periodic measurement configuration comprises information on repetitive time windows;
   wherein the macrocell base station is configured to adapt a duration of the time windows such that, when the user equipment moves slower than the velocity threshold through a cell formed by the smaller cell base station, wherein the at least one processor is configured to perform at least two inter-frequency measurements when moving along a straight line through a center of the cell and configured to perform a single measurement when moving along a straight line through the center of the cell faster than the velocity threshold.

2. The user equipment of claim 1, wherein the repetition cycle is at least one of equal or greater than 640 ms, equal or greater than a discontinuous reception cycle of the user equipment, and such that a relaxed performance requirement is achieved.

3. The user equipment of claim 1, wherein, when the user equipment is associated with the macrocell base station via a connected mode, the receiver is configured to receive the information with the periodic measurement configuration through a dedicated connection between the user equipment and the macrocell base station.

4. The user equipment of claim 1, wherein the information carrying the inter-frequency measurements comprises a physical cell identity of a cell formed by the smaller cell base station.

5. The user equipment of claim 1, wherein the at least one processor is configured to measure the radio signal on the second frequency layer at least once per time window.

6. The user equipment of claim 5, wherein the information carrying the periodic measurement configuration comprises information on a quantity of measurements to be taken within the time window and the at least one processor is configured to perform the quantity of measurements within each time window.

7. The user equipment of claim 1, wherein, when the user equipment is in an idle mode, the receiver is configured to receive the information with the periodic measurement configuration from the macrocell base station via broadcast.

8. The user equipment of claim 1, wherein the information carrying the periodic measurement configuration comprises a list of physical cell identities for cells formed by smaller cell base stations configured to operate on the second frequency layer and the at least one processor is configured to measure radio signals from the smaller cell base stations indicated by the list of physical cell identities.

9. A macrocell base station for wireless communication in a mobile communication system, comprising:
   a transmitter configured to provide information to a user equipment on a first frequency layer, wherein the information includes a periodic measurement configuration identifying a repetition cycle for inter-frequency measurements for a second frequency layer used by a smaller cell base station when a coverage area formed by the smaller cell base station is within a coverage area formed by the macrocell base station, wherein the repetition cycle is such that, when the user equipment moves at a velocity below a velocity threshold through a central portion of the coverage area of the smaller cell base station, the user equipment makes inter-frequency measurements for at least two repetition cycles while the user equipment was within the coverage area of the smaller cell base station; and a receiver configured to receive information on inter-frequency measurements from the user equipment on the first frequency layer, wherein the information on inter-frequency measurements is received after the user equipment performed the inter-frequency measurements in accordance with the repetition cycle associated with the periodic measurement configuration, wherein the inter-frequency measurements include a signal measurement of a radio signal from the smaller cell base station on the second frequency layer while the user equipment moved through the coverage area of the smaller cell base station, wherein the signal measurement is indicative of a signal quality of the corresponding radio signal, wherein the information on inter-frequency measurements is reported by the user equipment when the signal quality represented by the signal measurement is greater than a reporting threshold such that the user equipment avoids reporting information on inter-frequency measurements when the signal quality represented by the signal measurement is not greater than the reporting threshold;

wherein the information carrying the periodic measurement configuration comprises information on repetitive time windows, the macrocell base station further comprising:

at least one processor configured to adapt a duration of the time windows such that, when the user equipment moves slower than the velocity threshold through a cell formed by the smaller cell base station, the user equipment carries out at least two inter-frequency measurements when moving along a straight line through a center of the cell and carries out a single measurement when moving along a straight line through the center of the cell faster than the velocity threshold.

10. The macrocell base station of claim 9, wherein the repetition cycle is at least one of equal or greater than 640 ms, equal or greater than a discontinuous reception cycle configured for the user equipment, and such that a relaxed performance requirement is achieved.

11. The macrocell base station of claim 9, wherein, when the macrocell base station is associated with the user equipment via a connected mode, the transmitter is configured to provide the information with the periodic measurement configuration through a dedicated connection between the user equipment and the macrocell base station.

12. The macrocell base station of claim 9, wherein the information carrying the inter-frequency measurements comprises a physical cell identity of a cell formed by the smaller cell base station and the transmitter is configured to provide information on a handover instruction to the user equipment subsequent to the receiver receiving the information on inter-frequency measurements carrying the signal measurement.

13. The macrocell base station of claim 9, further comprising:

at least one processor configured to detect proximity of the user equipment to a cell formed by the smaller cell base station based on the information carrying by the inter-frequency measurement of the radio signal on the second frequency layer;

wherein the transmitter is configured to provide information on another inter-frequency measurement to the user equipment with a different repetition cycle in the periodic measurement configuration in response to the receiver receiving the information on the inter-frequency measurements carrying the signal measurement.

14. The macrocell base station of claim 9, wherein, when the user equipment is in an idle mode, the transmitter is configured to provide the information with the periodic measurement configuration via broadcast.

15. The macrocell base station of claim 9, wherein the information carrying the measurement configuration comprises a list of physical cell identities for cells formed by smaller cell base stations configured to operate on the second frequency layer and the user equipment is configured to measure radio signals from the smaller cell base stations indicated by the list of physical cell identities.

16. The macrocell base station of claim 9, wherein the information carrying the periodic measurement configuration comprises information on a quantity of measurements to be taken within the time window.

17. A method for wireless communication in a mobile communication system, comprising:

receiving information from a macrocell base station of a mobile communication system at a user equipment on a first frequency layer, wherein the information includes a periodic measurement configuration identifying a repetition cycle for inter-frequency measurements for a second frequency layer used by a smaller cell base station when a coverage area formed by the smaller cell base station is within a coverage area formed by the macrocell base station, wherein the repetition cycle is such that, when the user equipment moves at a velocity below a velocity threshold through a central portion of the coverage area of the smaller cell base station, the user equipment makes inter-frequency measurements for at least two repetition cycles while the user equipment was within the coverage area of the smaller cell base station;

performing the inter-frequency measurements in accordance with the repetition cycle associated with the periodic measurement configuration, the inter-frequency measurements including a signal measurement of a radio signal from the smaller cell base station on the second frequency layer while the user equipment moved through the coverage area of the smaller cell base station, wherein the signal measurement is indicative of a signal quality of the corresponding radio signal; and reporting information on the inter-frequency measurements from the user equipment to the macrocell base station on the first frequency layer, wherein the information on the inter-frequency measurements is reported when the signal quality represented by the signal measurement is greater than a reporting threshold such that the user equipment avoids reporting information on inter-frequency measurements when the signal quality represented by the signal measurement is not greater than the reporting threshold;

wherein the information carrying the periodic measurement configuration comprises information on repetitive time windows;

wherein the macrocell base station is configured to adapt a duration of the time windows such that, when the user equipment moves slower than the velocity threshold through a cell formed by the smaller cell base station, the user equipment carries out at least two inter-frequency measurements when moving along a straight line through a center of the cell and carries out a single measurement when moving along a straight line through the center of the cell faster than the velocity threshold.

18. A method for wireless communication in a mobile communication system, comprising:

providing information from a macrocell base station of a mobile communication system to a user equipment on a first frequency layer, wherein the information includes a periodic measurement configuration identifying a repetition cycle for inter-frequency measurements for a second frequency layer used by a smaller cell base station when a coverage area formed by the smaller cell base station is within a coverage area formed by the macrocell base station wherein the repetition cycle is such that, when the user equipment moves at a velocity below a velocity threshold through a central portion of the coverage area of the smaller cell base station, the user equipment makes inter-frequency measurements for at least two repetition cycles while the user equipment was within the coverage area of the smaller cell base station; and receiving information on inter-frequency measurements from the user equipment at the macrocell base station on the first frequency layer, wherein the information on inter-frequency measurements is received after the user equipment performed the inter-frequency measurements in accordance with the repetition cycle associated with the periodic measurement configuration, wherein the inter-frequency measurements include a signal measurement of a radio signal from the smaller cell base station on the second frequency layer while the user equipment moved through the coverage area of the smaller cell base station, wherein the signal measurement is indicative of a signal quality of the corresponding radio signal, wherein the information on inter-frequency measurements is reported by the user equipment when the signal quality represented by the signal measurement is greater than a reporting threshold such that the user equipment avoids reporting information on inter-frequency measurements when the signal quality represented by the signal measurement is not greater than the reporting threshold;

wherein the information carrying the periodic measurement configuration comprises information on repetitive time windows, the method further comprising:

adapting a duration of the time windows such that, when the user equipment moves slower than the velocity threshold through a cell formed by the smaller cell base station, the user equipment carries out at least two inter-frequency measurements when moving along a straight line through a center of the cell and carries out a single measurement when moving along a straight line through the center of the cell faster than the velocity threshold.

* * * * *